INVENTOR
ALVIN F. O'HARAH
BY
ATTORNEYS

INVENTOR
ALVIN F. O'HARAH

United States Patent Office 3,610,136
Patented Oct. 5, 1971

3,610,136
AUTO CRUSHING AND CHOPPING MACHINE
Alvin F. O'Harah, 163 Kerr Lane,
Reynoldsville, Pa. 15851
Filed Dec. 1, 1969, Ser. No. 881,135
Int. Cl. B30b 9/32
U.S. Cl. 100—95          8 Claims

ABSTRACT OF THE DISCLOSURE

The auto body crushing and chopping machine includes a frame in which a driven rotor assembly having a shaft is journaled, the rotor assembly carrying cutter knives therearound. A fixed wall in the frame has its lower end disposed above the rotor assembly, the wall sloping upwardly and outwardly with respect to the frame. A movable wall in the frame cooperates with the fixed wall, the movable wall converging towards the fixed wall. A cutter bar is provided on the lower end of the fixed wall cooperating with the cutter knives of the rotor assembly. Power means are provided for moving the movable wall laterally towards the fixed wall. Other power means are provided for moving the movable wall vertically with respect to the fixed wall, so that when an auto body is dropped between the walls the first power means will act to crush the body between the walls, and the second power means will act to pull the crushed body downwardly between the cutter bar and cutting knives to chop the crushed body into small scrap pieces.

DESCRIPTION OF INVENTION

My invention is a novel auto body crushing and chopping machine. I have found that the selective separation of the various materials from which an automobile body is made, can be more readily accomplished when the various parts thereof are broken or sheared into small pieces. The reasoning behind this assumption is that when the component scrap pieces are small there is less chance that contaminating materials can be entrapped by parts bending or folding over each other. Obviously, before chopping a scrap automobile body to the desired small piece size, the automobile body should be first stripped of all ferrous-chrome-nickel combination materials such as bumpers, trim, etc. Also, the removal of engines, gear boxes and springs creates a rather large amount of valuable scrap that does not need much further processing, and should be initially removed so as not to affect the breaking down, crushing or chopping of the remaining parts of the automobile body.

The principal objects of my invention are to provide a machine which will chop a stripped automobile body which is to be scrapped into desired small pieces; also to provide a machine of the above type which can be mounted upon a low-wheeled trailer body so as to be transportable from place-to-place, as desired; also to provide a machine comprising a frame which may be mounted on a trailer body, said frame extending upwardly from one side of the body and carrying at approximately the axis of the trailer body an upwardly and outwardly inclined fixed wall, the upper portions of which are extensible, and the lower portion of the fixed wall carrying a cutting plate cooperating with rotary cutters on a rotary assembly disposed below the cutting plate, which rotary assembly is driven by suitable means to shear metallic and other materials passing between the cutting blade and rotary cutters. Cooperating with the fixed wall is a movable wall which is movable by power means vertically and laterally with respect to the fixed wall, the fixed wall and movable wall forming a converging pressure means on an automobile body fed into the top of the converging walls, thus drawing the automobile body downwardly and crushing same into a relatively thin strip which will be engaged by the cutting blade and rotary cutters to sever off lengths of the crushed automobile body.

Another object of the invention is to provide means whereby the crushed or separated portions fall onto a horizontal endless conveyor disposed below the rotary cutter, the separated portions being transferred to an endless conveyor belt which raises the cut portions and drops same onto a second conveyor belt which runs over a magnetized drum, the non-magnetic portions of the cut pieces falling upon a third conveyor belt, while the magnetic portions are retained by the magnetized drum and carried beyond the third conveyor belt, and dropped upon a fourth conveyor belt disposed at an angle to the third conveyor belt, the third and fourth conveyor belts being pivotally mounted so that they may be swung into substantial alignment with the truck body in order to meet the dimensions when folded required by all State Laws for over-the-road hauling.

Other minor objects of the invention will be hereinafter set forth.

I will explain the invention with reference to the accompanying drawings, which illustrate one practical embodiment thereof to enable others familiar with the art to adopt and use the same; and will summarize in the claims the novel features of construction, and novel combinations of parts, for which protection is desired.

Figure 3:
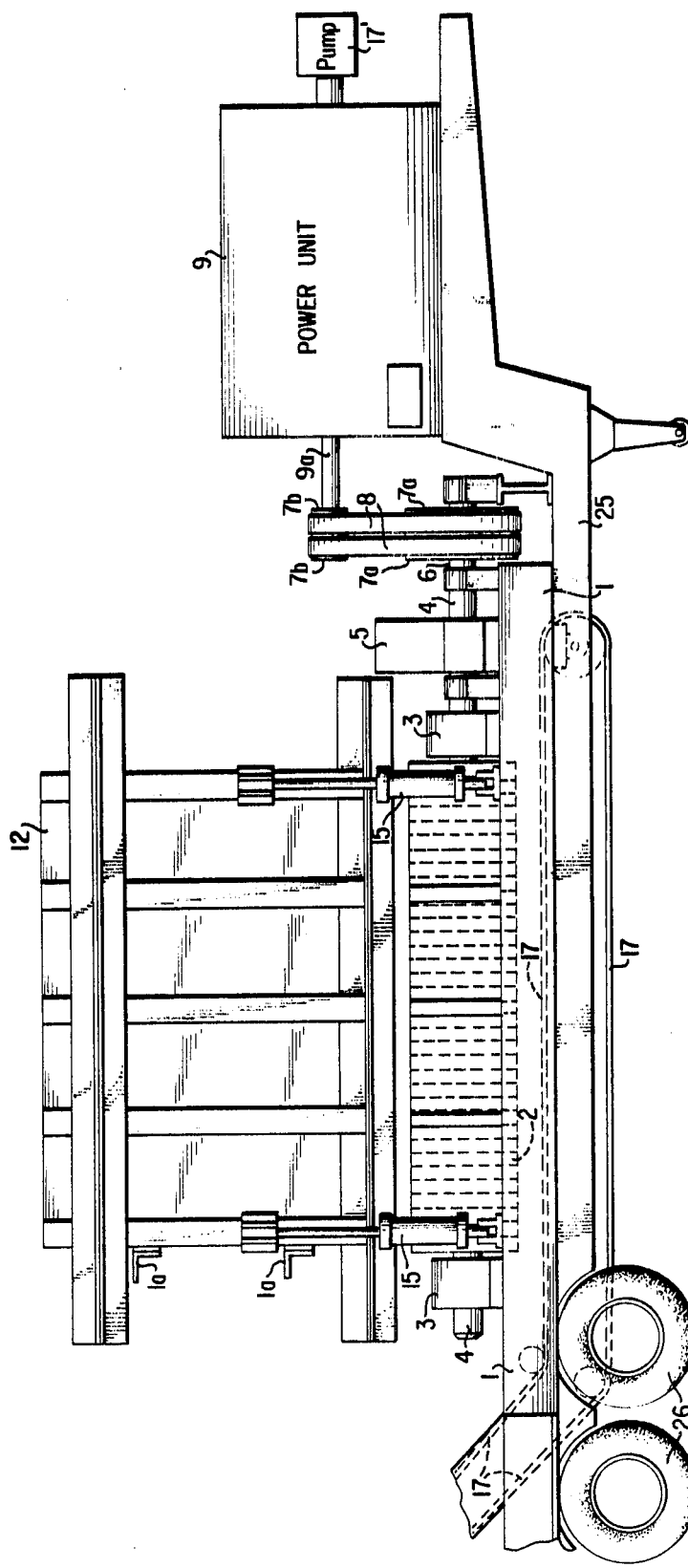
FIG. 3 is a view similar to FIG. 2 but looking at the other side of the machine, to wit, the side containing the movable wall, and showing the means for driving the rotor assembly.

The machine consists of a base frame 1 which has a rotor assembly 2 mounted on it in bearing blocks 3 for the shaft 4. At the forward end of the rotor assembly is mounted a roller chain and sprocket assembly 5 in which the larger sprocket 5a mounted on the rotor shaft 4 and the smaller sprocket 5b mounted on a jack shaft 6 journaled on the frame, FIG. 1, a chain 5c running around said sprockets 5a, 5b. On the jack shaft 6 is also mounted the large pulley 7a of a toothed-timing belt assembly, the timing belt 8 running around pulley 7a and around a smaller pulley 7b which is mounted on the drive shaft 9a of a power unit 9, the relative positions of the above parts being best shown in FIG. 3.

Figure 1:
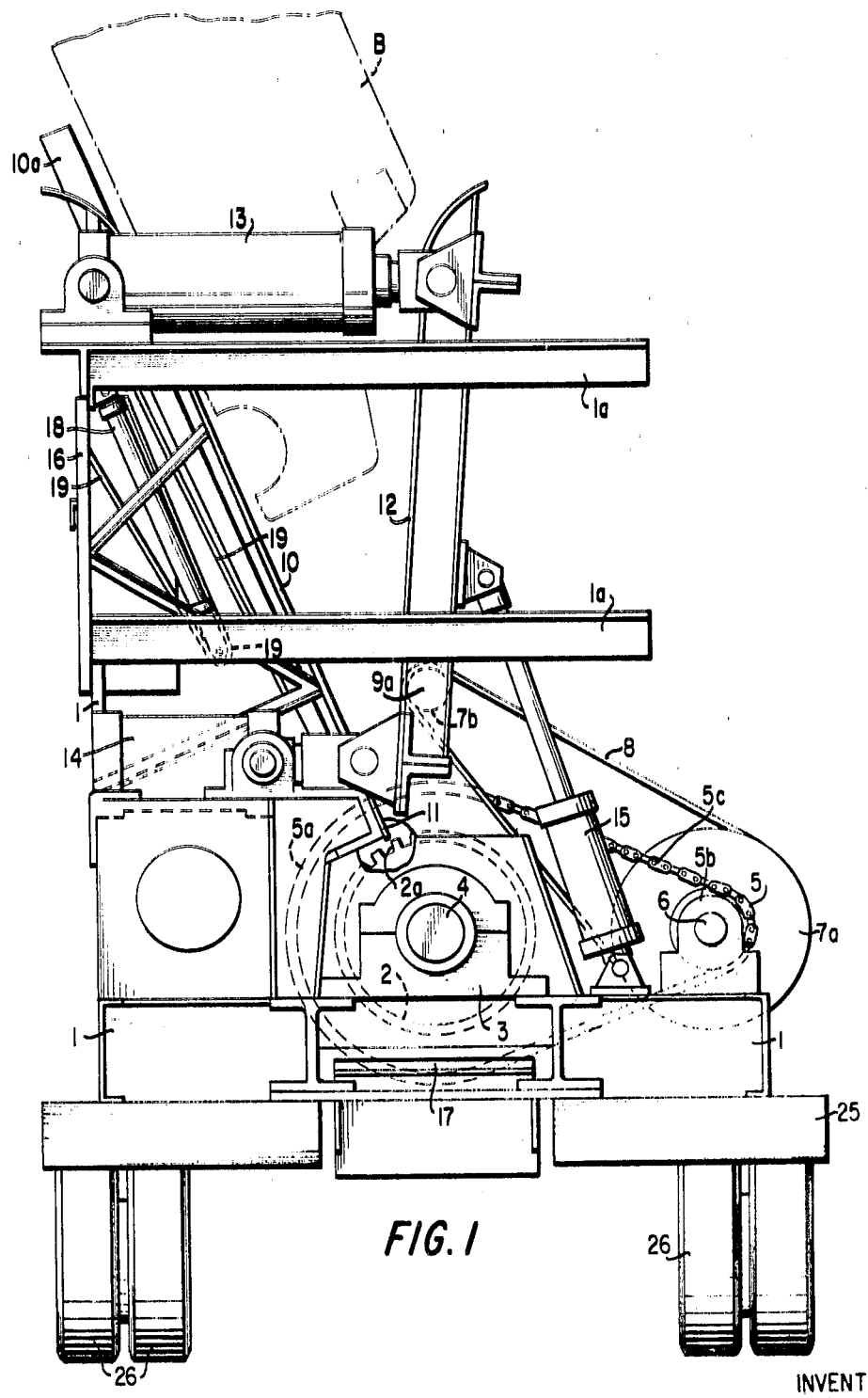
FIG. 1 is an end elevation of my novel automobile crushing and chopping machine.

In FIG. 1, on the left hand side, is shown the stationary wall assembly 10 which is fixed to frame 1 and remains stationary at all times. The lower end of the stationary wall 10 terminates adjacent the top of the rotor 2 adjacent the axis thereof, and wall 10 slopes upwardly and outwardly of the frame 1 as shown in FIG. 1, and has a series of telescoping extension bars 10a, FIG. 2, for the purpose hereinafter described.

In line with stationary wall 10 and rotor 2 there is fixed to the frame 1 a cutter bar 11, FIG. 1, which cooperates with cutter knives 2a on the rotor assembly 2 for shearing action. On the opposite side of the frame 1 from stationary wall 10 is a movable wall assembly 12, FIG. 1, that is movable in-and-out with respect to stationary wall 10 by horizontally disposed hydraulic cylinders 13 at the top, and 14 at the bottom of wall 12, said wall being guided between the horizontal members 1a at the ends of the frame 1, the cylinders 13 and 14 being pivoted on the frame 1 while the pistons thereof are pivoted to the movable wall 12. The movable wall assembly 12 is also movable up-and-down by vertical hydraulic cylinders 15 adjacent the ends thereof which are pivoted on the frame 1, and the pistons thereof pivoted to the movable wall 12, as shown in FIG. 1. The movement of the pistons of cylinders 13, 14 and 15 is controlled by valves, pressure switches, etc., in a control box 16, FIG. 1, and the power for activating the cylinders 13, 14, 15 is supplied by pump 17, FIG. 3, driven by the power unit 9.

Stationary wall extensions 10a are movable upwardly with respect to wall 10 by an hydraulic cylinder 18, FIG. 1, acting upon a rope-and-pulley assembly 19. When the extensions 10a are raised upwardly in place, and cylinders 13 and 14 are extended to further separate walls 10 and 12, and cylinder 15 is extended upwardly to separate the lower ends of walls 10 and 12, an auto body B that is placed between the walls 10 and 12, as shown in dot-and-dash lines in FIG. 1 is allowed to drop until it is caught by wedging action between walls 10 and 12. When the horizontal cylinders 13 and 14 are retracted, this will crush the auto body between the walls 10 and 12. Then cylinder 15 may be activated thereby pulling wall 12 downwardly and with it the crushed auto body B into and between the cutters 2a on rotary assembly 2 to shear the crushed auto body along cutter bar 11a.

Figure 2:
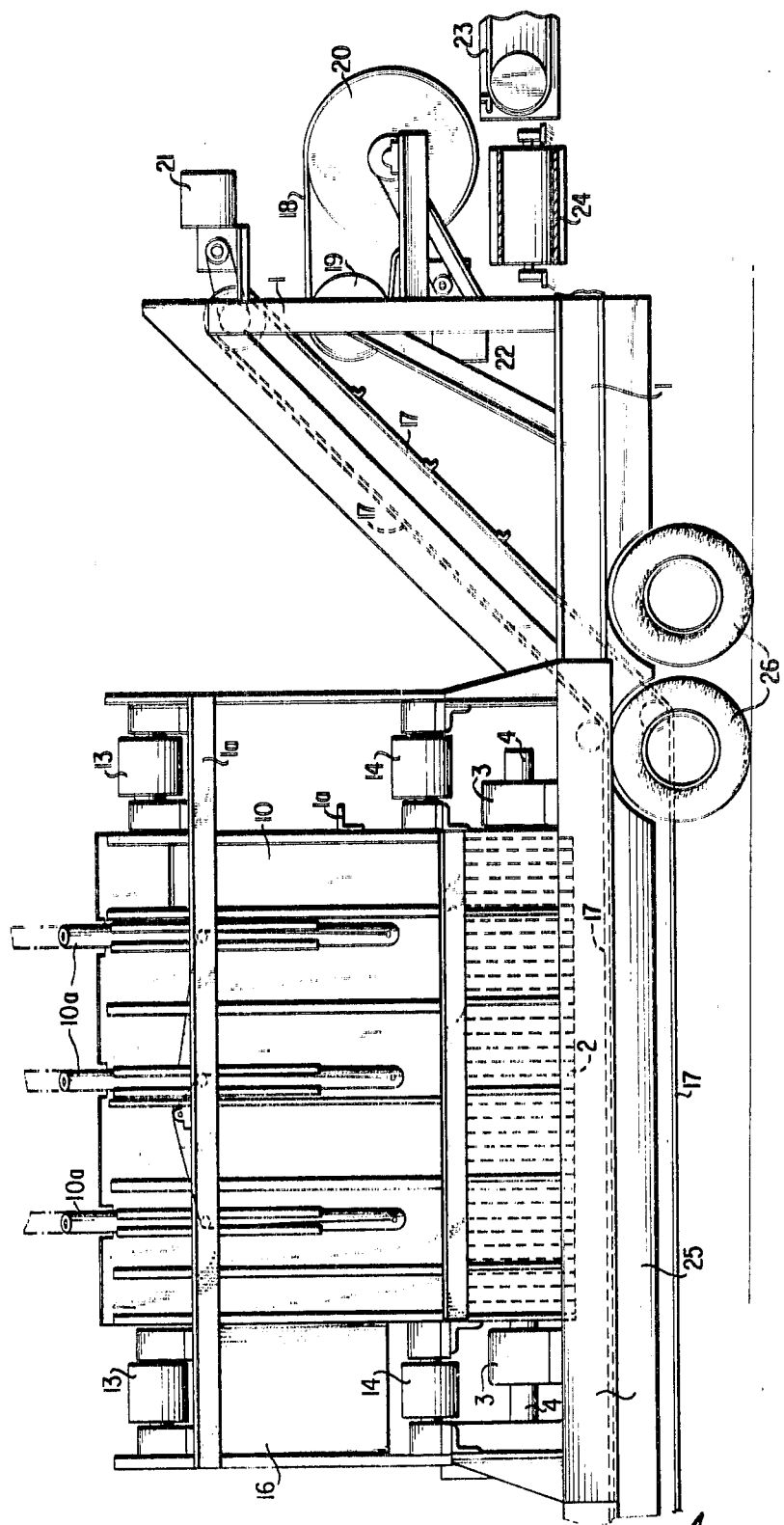
FIG. 2 is a side elevation thereof looking at the fixed wall of the machine and showing the arrangement of conveyor belts.

After the sheared parts are thus cut they will drop onto conveyor belt 17 and will be carried out from under the rotary assembly 2, and upwardly, and deposited upon the upper separation conveyor belt 18, FIG. 2 which runs around drums 19 and 20 journaled in bearings in frame 1, as shown in FIG. 2. Conveyor 17 is powered by a motor 21 carried by frame 1.

Separation conveyor belt 18 is driven by a motor 22, the belt running over a large magnetic drum 20 which is somewhat wider than the conveyor belt 17 so that ferrous and non-ferrous material can spread out thereon and be more readily magnetically separated. The non-magnetic material will drop off from the drum 20 onto a conveyor 23 which is pivotable through horizontal and vertical arcs, and which conveyor 23 will raise the non-magnetic material up so it can be loaded or piled as needed. The magnetic material, however, on conveyor belt 18 will follow the belt 18 around the magnetic drum 20 and drop onto conveyor belt 24 which also is pivotable through horizontal and vertical arms and which will raise the magnetic material up so it can also be loaded or piled.

The entire machine including the various conveyors may be mounted on a low trailer truck body 25 having wheels 26. Since the wall extensions 10a can be retracted, and conveyors 23 and 24 can be swung or pivoted horizontally around toward the front of the trailer body 25, the complete unit can be folded within the dimensions required by all state laws for over-the-road hauling.

I claim:

1. An auto body crushing and chopping machine comprising a frame; a rotor assembly having a shaft journaled in the frame and carrying cutter knives disposed therearound; means for rotating the shaft; a fixed wall in the frame having its lower end disposed above the rotor assembly, said wall sloping upwardly and outwardly with respect to said frame; a movable wall in the frame cooperating with said fixed wall, the movable wall converging towards the fixed wall; a cutter bar on the lower end of the fixed wall cooperating with the cutter knives of the rotor assembly; power means for moving the movable wall laterally towards the fixed wall; and other power means for moving the movable wall vertically with respect to the fixed wall, whereby when an auto body is dropped between the said walls the first power means will act to crush the body between the walls and the second power means will act to pull the crushed body downwardly between the cutter bar and cutting knives to chop the crushed body into small scrap pieces.

2. In a machine as set forth in claim 1, said frame being mounted on a low-wheeled trailer truck body.

3. In combination with a machine as set forth in claim 1, a first endless conveyor in the frame disposed below the rotor assembly receiving the chopped scrap pieces; a second endless conveyor belt receiving the discharge of the first belt conveyor, said second conveyor including a magnetic drum; a third endless conveyor receiving the non-magnetic scrap pieces falling off said magnetic drum; and a fourth endless belt conveyor receiving the magnetic scrap pieces which are carried around the magnetic drum beyond the third conveyor and then deposited on the fourth conveyor.

4. In a machine as set forth in claim 3, said frame being mounted on a low-wheeled trailer truck body; and said third and fourth conveyors being swingable on vertical and horizontal axes whereby the same may be swung over the truck body and folded within dimensions required by state laws for over-the-road hauling.

5. In a machine as set forth in claim 1, said means for rotating the shaft comprising a power unit mounted on the frame and having a drive shaft; a jack shaft mounted on the frame parallel with the rotor assembly shaft; a toothed belt running around pulleys on the drive shaft and rotor assembly shaft; and a chain running around sprockets on the jack shaft and rotor assembly shaft.

6. In a machine as set forth in claim 1, said first power means comprising horizontally disposed hydraulic cylinders pivoted on the frame and disposed opposite the top and bottom respectively of the movable wall; the pistons of said cylinders being pivotally connected with the top and bottom respectively of the movable wall; said wall being guided in said frame; and a pump operated by the rotating means of the rotor assembly for actuating said cylinders.

7. In a machine as set forth in claim 1, said second power means comprising vertically disposed hydraulic cylinders pivoted on the frame and disposed opposite the ends of the movable wall, the pistons of said cylinders being pivotally connected with the said movable wall, said wall being guided in said frame; and a pump operated by the rotating means of the rotor assembly for actuating said cylinders.

8. In a machine as set forth in claim 1, a series of telescoping extension bars at the upper end of the fixed wall; an hydraulic cylinder in the frame; a rope-and-pulley assembly activated by the piston of said cylinder to raise the extension bars in the fixed wall; and a pump operated by the shaft of the rotating means of the rotor assembly for actuating said cylinder.

References Cited

UNITED STATES PATENTS

| | | | |
|---|---|---|---|
| 1,464,536 | 8/1923 | Nevill | 241—155 |
| 2,059,229 | 11/1936 | Gregg. | |
| 2,150,984 | 3/1939 | Near et al. | 241—186 |
| 2,949,078 | 8/1960 | Reed | 100—233 X |
| 3,283,698 | 11/1966 | Williams | 100—95 |
| 3,326,478 | 6/1967 | Van Endert | 241—186 |
| 3,426,674 | 2/1969 | Testolin | 100—95 |
| 3,518,078 | 6/1970 | Chazen. | |

BILLY J. WILHITE, Primary Examiner

U.S. Cl. X.R.

100—91, 100, 218, 233, 269, 295, Digest 1; 241—186, 222